United States Patent
Chen et al.

(10) Patent No.: US 11,586,257 B2
(45) Date of Patent: Feb. 21, 2023

(54) MOTHER SUBSTRATE AND DISPLAY PANEL

(71) Applicants: Beihai HKC Optoelectronics Technology Co., Ltd., Beihai (CN); HKC Corporation Limited, Shenzhen (CN)

(72) Inventors: Cheng-Hung Chen, Beihai (CN); Haijiang Yuan, Beihai (CN)

(73) Assignees: Beihai HKC Optoelectronics Technology Co., Ltd., Beihai (CN); HKC Corporation Limited, Shenzhen (CN)

( * ) Notice: Subject to any disclaimer, the term of this patent is extended or adjusted under 35 U.S.C. 154(b) by 0 days.

(21) Appl. No.: 17/385,415

(22) Filed: Jul. 26, 2021

(65) Prior Publication Data
US 2022/0091643 A1    Mar. 24, 2022

(30) Foreign Application Priority Data
Sep. 23, 2020    (CN) .......................... 202011012061.1

(51) Int. Cl.
*G06F 1/18*    (2006.01)
*G09G 3/00*    (2006.01)

(52) U.S. Cl.
CPC .............. *G06F 1/184* (2013.01); *G06F 1/189* (2013.01); *G09G 3/006* (2013.01); *G09G 2310/0278* (2013.01); *G09G 2330/12* (2013.01)

(58) Field of Classification Search
CPC .......... G06F 1/184; G06F 1/189; G09G 3/006; G09G 2310/0278; G09G 2330/12; G09G 3/2003; G09G 2300/0426; G02F 1/136286
See application file for complete search history.

(56) References Cited

U.S. PATENT DOCUMENTS

2008/0054798 A1*  3/2008  Jeong ................... G09G 3/3225
                                                                324/403
2019/0122943 A1*  4/2019  Lim .................... H01L 23/4985

* cited by examiner

*Primary Examiner* — Mark W Regn
(74) *Attorney, Agent, or Firm* — Dorsey & Whitney LLP

(57) ABSTRACT

A mother substrate and a display panel including the mother substrate are disclosed. The mother substrate includes: an input pad located on an edge of the mother substrate; and a sub-substrate. A switch array and one or more signal lines connected to the switch array are arranged in a display area of the sub-substrate. One end of the signal line lead out a first test portion, and another end of the signal line is connected to the input pad and lead out a second test portion. The first test portion and the second test portion are located on different conductive layers and are insulated from each other. Partial orthographic overlapping of the first test portion is overlapped with partial orthographic overlapping of the second test portion in the non-display area.

20 Claims, 3 Drawing Sheets

MOTHER SUBSTRATE AND DISPLAY PANEL

CROSS-REFERENCE TO RELATED APPLICATION

This application claims priority to Chinese Patent Application No. 202011012061.1, filed with the Chinese Patent Office on Sep. 23, 2020 and entitled "MOTHER SUBSTRATE AND DISPLAY PANEL," which is incorporated herein by reference in its entirety.

TECHNICAL FIELD

The present disclosure relates to a mother substrate and a display panel.

BACKGROUND

A process for fabricating a display panel includes multiple processing steps, such as steps of fabricating a mother substrate, plastic frame coating, liquid crystal dropping (ODF), alignment assembling, UV light alignment, cutting, attaching a polarizer, and bonding. After completing the fabrication of the mother substrate, test signals will be input to signal lines in the mother substrate for testing, so as to determine whether a current tape-out is normal. If it is normal, next process is performed. If it is abnormal, next process is not performed. Therefore, it is possible to avoid wasting time and cost due to subsequent fabricating processes being performed after an abnormality occurs. During the UV light alignment, it is also necessary to input electrical signals to the signal lines in the mother substrate so that liquid crystal molecules can be deflected to a certain angle. In the actual fabricating process, in order to simplify a portion design, the portion that transmits the signals to the signal lines in a photo-alignment step shares a test portion used in the step of testing the mother substrate. When testing the mother substrate, if the same signal line is connected to multiple test signals at the same time, it is difficult to detect whether the signal line is disconnected. Therefore, the same signal line generally only connects to one test signal during the test. That is, the test is performed by a single test pad. During the photo-alignment process, in order to ensure a better uniformity of the signal on the signal lines, it is generally necessary to connect the electrical signals at both ends of the same signal line, respectively. That is, it is necessary to connect two electrical signals. In this case, in order to take into account both the test for the mother substrate and the photo-alignment process, it is necessary to ensure that paths of the electrical signals connected to both ends of the signal line are independent of each other. Therefore, two independent pads are generally provided. When testing the mother substrate, only one of the two independent pads is used to input a single test signal to the same signal line, so as to ensure that the abnormal of the disconnected signal line can be detected. When performing the photo-alignment, two pads are used to input two electrical signals to the same signal line at the same time, so as to ensure that the signal on the signal line has a better uniformity.

SUMMARY

According to embodiments of the disclosure, the present disclosure provides a mother substrate and a display panel. A mother substrate includes: an input pad located on an edge of the mother substrate; and a sub-substrate having a display area and a non-display area. A switch array and one or more signal lines connected to the switch array are arranged in the display area. One end of the signal line lead out a first test portion, and another end of the signal line is connected to the input pad and lead out a second test portion. The first test portion and the second test portion are located on different conductive layers and are insulated from each other, and the first test portion and the second test portion project on the non-display area to form an orthographic overlapping area.

In one of the embodiments, the signal line includes a data line and a scanning line. The input pad includes a data signal input pad and a scan signal input pad. The data line is connected to the data signal input pad. One end of the scanning line lead out the first test portion, and another end of the scanning line is connected to the scan signal input pad and lead out the second test portion.

A display panel includes: any one of the mother substrates as described above; a color film substrate disposed opposite to the mother substrate; and a plastic frame disposed on a non-display area of the sub-substrate and located between the mother substrate and the color film substrate to support the color film substrate. The plastic frame passes through an orthographic overlapping area of the first test portion and the second test portion such that the first test portion and the second test portion are connected to each other in the orthographic overlapping area.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

The following drawings of the present disclosure are used herein as part of the present disclosure to understand the present disclosure. Embodiments of the present disclosure and description thereof are illustrated in the accompanying drawings to explain the principle of the present disclosure.

DETAILED DESCRIPTION OF THE EMBODIMENTS

In the structure described in the Background, two groups of pads are correspondingly provided for the same signal line, such that a large number of pads is disposed on the substrate, which occupies a larger area, resulting in a more complicated structure of the substrate.

Embodiments of the present application are described more fully hereinafter with reference to the accompanying drawings. The various embodiments of the present application may, however, be embodied in many different forms and should not be construed as limited to the embodiments set forth herein. Rather, these embodiments are provided so that this disclosure will be thorough and complete, and will fully convey the scope of the present application to those skilled in the art.

Unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items.

It will be understood that when an element is referred to as being "connected" or "coupled" to another element, it can be directly connected or coupled to the other element or intervening elements may be present.

Figure 1:
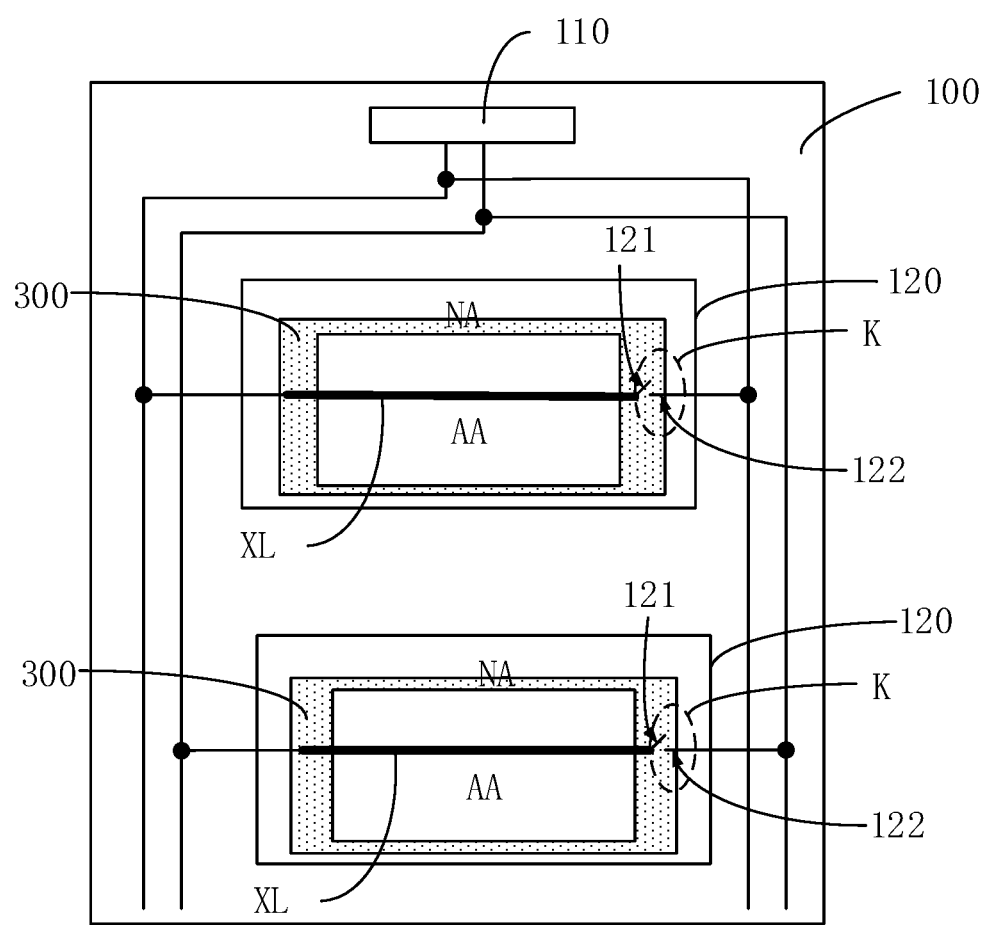
FIG. 1 is a schematic view showing a mother substrate according to an embodiment of the present application.
Figure 2A:
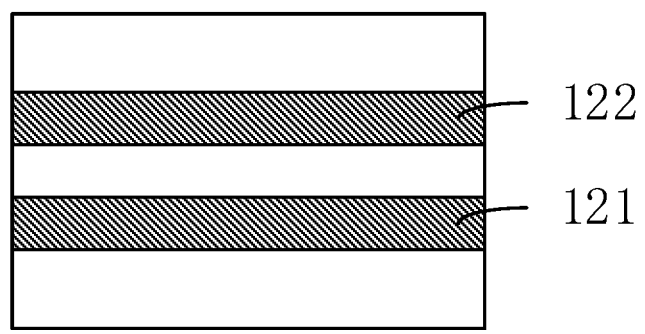
FIG. 2a is a schematic view showing a first testing portion disconnected with a second test portion according to an embodiment of the present application.

In an embodiment, as shown in FIG. 1, a mother substrate 100 is arranged with a sub-substrate 120 therein. An input pad 110 is provided on an edge of the mother substrate 100. The input pad 110 is used to connect to an electrical signal. The sub-substrate 120 is connected to the input pad 110 to obtain the electrical signal through the input pad 110. Specifically, the sub-substrate 120 has a display area AA and a non-display area NA. A switch array and a signal line XL connected to the switch array are arranged in the display area AA. One end of the signal line XL lead out a first test portion 121, and another end of the signal line XL is connected to the input pad 110 and lead out a second test portion 122. As shown in FIG. 2a and FIG. 1, the second test portion 122 and the first test portion 121 overlap with each other when orthographically projected in the non-display area NA of the corresponding sub-substrate 120.

Figure 2B:
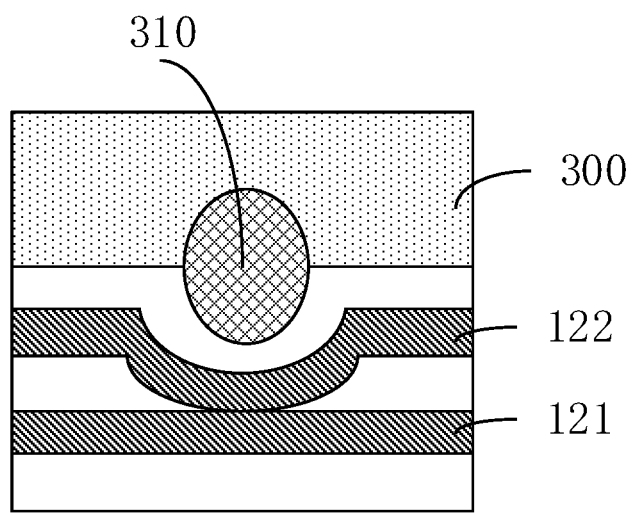
FIG. 2b is a schematic view showing a first testing portion connected with a second test portion when squeezed according to an embodiment of the present application.

In the sub-substrate 120 of the present application, an end of the signal line XL lead out the first test portion 121, and another end thereof is directly connected to the input pad 110 and lead out the second test portion 122. Once the input pad 110 is connected to an electrical signal, the end of the signal line XL directly connected to the input pad 110 can obtain the electrical signal. In addition, since the first test portion 121 and the second test portion 122 are located on different conductive layers and are insulated from each other, the second test portion 122 is disconnected with the second test portion 122 after completing the fabrication of the mother substrate 100. That is, the end of the signal line XL leading to the first test portion 121 will not obtain the electrical signal from the input pad 110. After completing the fabrication of the mother substrate 100, the input pad 110 is connected to the electrical signal, and the electrical signal is only input from one end of the signal line XL. When the signal line XL is disconnected, a back part of the disconnected signal line will not obtain the electrical signal, which causes the corresponding switch array to not to be in an on state, thereby detecting the abnormality of the disconnected signal line. After the mother substrate 100 passes the test, the subsequent steps of plastic frame coating, liquid crystal filling, and alignment assembling will be performed to form a display panel. During the plastic frame coating process, a plastic frame is coated in the non-display area NA of the sub-substrate 120 for filling liquid crystal. Since the plastic frame material contains large-size particles and thus has a relatively rough surface, in a process of disposing the plastic frame and squeezing and assembling the mother substrate 100 and a large color film substrate, the plastic frame will squeeze the relevant film layer of the mother substrate below the plastic frame. Therefore, when providing the portion, it is generally necessary to avoid forming a jumper wire directly below the plastic frame, so as to avoid short-circuits due to contact between the jumper wires when squeezed by the plastic frame. In the present application, the first test portion 121 and the second test portion 122 are provided, and an orthographic overlapping area K is formed when the first test portion 121 and the second test portion 122 are orthographically projected in the non-display area NA. When testing the mother substrate 100, the first test portion 121 and the second test portion 122 in the orthographic overlapping area K are insulated from each other, as shown in FIG. 2a. When plastic frame coating is performed on the mother substrate 100 and then the alignment assembling is performed on the mother substrate 100 and the color film substrate, the plastic frame 300 passes through the orthographic overlapping area K. As shown in FIG. 2b, the first test portion 121 and the second test portion 122 in the orthographic overlapping area K are in contact with each other due to being squeezed by a protruding particle 310 on a surface of the plastic frame and are thus short-circuited, so that the end of the signal line XL leading to the first test portion 121 is also connected to the input pad 110. Therefore, when the panel is photo-aligned, the electrical signal can be input to both ends of the signal line simultaneously through one test pad. It can be learned from the above analysis that, since the mother substrate of the present application is provided with the first test portion and the second test portion, when testing the mother substrate, the electrical signal is only input to one end of the signal line through one input pad. When the mother substrate is assembled with the color film substrate and then the photo-alignment is performed, the electrical signal can be input to both ends of the signal line simultaneously through one input pad, thereby reducing the number of input pads and the area occupied by the pads.

Figure 3:
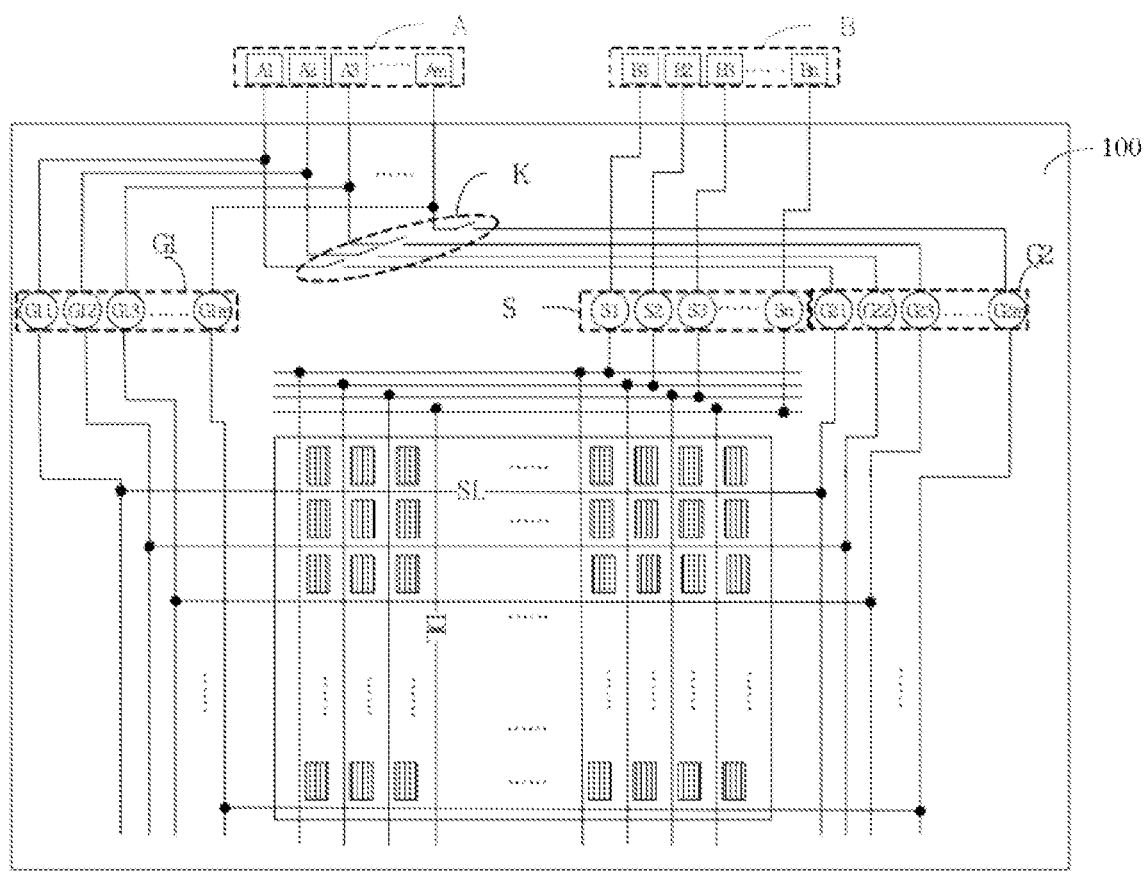
FIG. 3 is a schematic view showing a mother substrate according to an embodiment of the present application.

In an embodiment, as shown in FIG. 3, it should be noted that the portion shown in FIG. 3 only shows a connection relationship between various structures, and which does not limit actual positions. The signal line in the display area AA includes data lines DL and scanning lines SL. The switch array in the display area AA is a thin film transistor array. The data lines DL and the scanning lines SL are crisscrossed and connected to the thin film transistors, respectively. Correspondingly, the input pad 110 includes a scan signal input pad A and a data signal input pad B. Specifically, one end of the data line DL is connected to the data signal input pad B, and one end of the scanning line SL lead out the first test portion 121, and another end of the scanning line SL is connected to the scan signal input pad A and lead out the second test portion 122. In this embodiment, selecting the scanning line to be provided with the above-mentioned portion design can not only detect the disconnection of the scanning line, but also make the signal on the scanning line more uniform in the subsequent photo-alignment process. It is understandable that the data line can also be selected to be provided with the above-mentioned portion or both the data line and the scanning line can be selected to be provided with the above-mentioned portion design.

In an embodiment, as shown in FIG. 1, the above-mentioned mother substrate 100 includes a plurality of sub-substrates 120. During a process of fabricating the display panel, the plurality of sub-substrates are usually fabricated on a large glass plate at the same time. Subjected to a series of processes, the mother substrate 100 is assembled with the color film substrate to form the display panel, and then cut into a plurality of discrete display panels through a cutting process. In this way, the plurality of display panels can be fabricated at the same time, which improves efficiency and utilization of glass substrates. When the mother substrate includes a plurality of sub-substrates, during the relevant processes before cutting, such as testing and photo-alignment, it is necessary to input the electrical signal to one or more signal lines in each sub-substrate. In order to facilitate the connection with probes, the input pad is generally provided at the edge of the mother substrate, and is connected to the signal lines of each sub-substrate through portion. Especially after the mother substrate is assembled with the color film substrate, the electrical signals can only be transmitted through the input pad located at the edge of the mother substrate.

In an embodiment, when the mother substrate includes a plurality of sub-substrates 120, a scan test pad G1 and a scan test pad G2 may be provided in the non-display area NA of each sub-substrate 120. One end of the scanning line SL is connected to the scan test pad G2 and the first test portion 121. Specifically, one end of the scanning line SL lead out the first test portion 121 through the scan test pad G2. Another end of the scanning line SL is connected to the scan test pad G1 and the scan signal input pad A. Specifically, another end of the scanning line SL is connected to the scan signal input pad A through the scan test pad G1, and lead out the second test portion 122 through the scan test pad G1. In an embodiment, a data test pad S may be further disposed in the non-display area NA of the sub-substrate 120. The data line DL is connected to the data signal input pad B and the data test pad S. Specifically, the data line DL is connected to the data signal input pad B through the data test pad S. In the above-mentioned embodiment, a test pad is disposed in each sub-substrate, and the portion of the part shared by the test pad and the input pad is connected to the signal line. When testing the mother substrate, the electrical signal can be input through the input pad, or be input through the test pad. Moreover, when the mother substrate is fabricated into the display panel, it will be cut to form a plurality of sub-panels. In this case, the input pad will be cut off. When testing the sub-panel, the test signal can no longer be input through the input pad. If the test pad is provided in the sub-panel, it can be used to input the test signal when testing sub-panels later.

In an embodiment, each scan test pad has a plurality of independent test terminals, and different test terminals of the same scan test pad are connected to different scanning lines. As shown in FIG. 3, the scan test pad G1 has m test terminals, which are G11 to G1m, respectively. The scan test pad G2 also has m test terminals, which are G21 to G2m, respectively. One end of the scanning line SL is connected to G1x, another end thereof is connected to G2x, and different test ends thereof are connected to different scanning lines. There are many scanning lines in the display area. In this embodiment, the scanning lines are divided into m groups. Each group of scanning lines is tested separately, so that the test results are more accurate. Similarly, the data test pad S can also have a plurality of independent test terminals, and different test terminals thereof are connected to different data lines. For example, the data test pad S has n test terminals, which are 51 to Sn, respectively, and different test terminals thereof are connected to different data lines. Therefore, the data lines can also be divided into n groups and tested independently to improve the test accuracy. In an embodiment, when the test signal is connected through the input pad, the input pad also includes a plurality of input terminals. Test terminal of the test pad are connected to different input terminals of the input pad, respectively, so as to test each group of signal lines through the input pad, respectively. For example, the scan input pad A includes input terminals A1 to Am, and the test terminals G11 to G1m of the scan test pad G1 are connected to the input terminals A1 to Am of the scan input pad A in a one-to-one correspondence. The test terminals G21 to G2m of the scan test pad G2 lead to m first test portions that are mutually independent, respectively. The test terminals G11 to G1m of the scan test pad G1 lead to m second test portions that are mutually independent, respectively. The first test portion and the second test portion are provided in one-to-one correspondence.

In an embodiment, the switch array in the display area AA is a thin film transistor array, which includes a first metal layer and a second metal layer. Generally, a gate is usually formed on the first metal layer, and a source and a drain are formed on the second metal layer. In this embodiment, one of the first test portion 121 and the second test portion 122 in the non-display area NA is located on the same layer as the first metal layer, and the other one of the first test portion 121 and the second test portion 122 in the non-display area NA is located on the same layer as the second metal layer. For example, when the first test portion and the first metal layer are located on the same layer, and the second test portion and the second metal layer are located on the same layer, the first metal layer and the first test portion can be formed at the same time through a photo engraving process in one step, and the second metal layer and the second test portion can be formed at the same time through the photo engraving process in one step, thereby simplifying the process steps.

In an embodiment, each sub-substrate of the above-mentioned mother substrate includes a gate driver on array (GOA, mother substrate row driver) circuit. A gate drive circuit is directly fabricated on the substrate in the GOA circuit, thereby omitting a gate drive integrated circuit and a bonding process of the circuit and the substrate, simplifying the process and reducing the cost. When the sub-substrate includes the GOA circuit, a connecting portion of the signal line and the input pad shares a portion of the gate drive circuit on the substrate.

The present application also relates to a display panel, which includes a mother substrate 100; a color film substrate (not shown in the figures) disposed opposite to the mother substrate, and a plastic frame 300 disposed on a non-display area NA of each sub-substrate 120 and located between the mother substrate 100 and the color film substrate to support the color film substrate. The mother substrate 100 may be the above-mentioned mother substrate, and since the structure thereof has been described in detail, which will be omitted for brevity. The plastic frame 300 passes through the orthographic overlapping area K of the first test portion 121 and the second test portion 122. In this application, the mother substrate used in the display panel includes the first test portion and the second test portion. Through designing the first test portion and the second test portion, when the mother substrate is formed, the first test portion and the second test portion are disconnected. When the plastic frame is formed on the mother substrate and then the mother substrate and the color film substrate are squeezed and assembled with each other, the first test portion and the second test portion are squeezed to be in contact with each other and thus connected with each other. Therefore, the requirements of the mother substrate and the display panel for electrical signal input are met.

Although the present application is illustrated and described herein with reference to specific embodiments, the present application is not intended to be limited to the details shown. Rather, various modifications may be made in the details within the scope and range of equivalents of the claims and without departing from the present application. Therefore, the protection scope of the present application shall be subject to the protection scope of the appended claims.

What is claimed is:

1. A mother substrate, comprising:
an input pad located on an edge of the mother substrate; and
a sub-substrate having a display area and a non-display area, wherein a switch array and one or more signal lines connected to the switch array are arranged in the display area, one end of the signal line lead out a first test portion, and another end of the signal line is connected to the input pad and lead out a second test portion, the first test portion and the second test portion are located on different conductive layers and are insulated from each other, and the first test portion and the second test portion project on the non-display area to form an orthographic overlapping area.

2. The mother substrate according to claim 1, wherein the signal line comprises a data line and a scanning line, the input pad comprises a data signal input pad and a scan signal input pad, the data line is connected to the data signal input pad, and one end of the scanning line lead out the first test portion, and another end of the scanning line is connected to the scan signal input pad and lead out the second test portion.

3. The mother substrate according to claim 2, wherein the mother substrate comprises a plurality of sub-substrates.

4. The mother substrate according to claim 3, wherein a data test pad is provided in the non-display area, the data line is connected to the data signal input pad and the data test pad.

5. The mother substrate according to claim 3, wherein two scan test pads are provided in each non-display area, the one end of the scanning line is connected to one of the two scan test pads and lead out the first test portion, another end of the scanning line is connected to the other one of the two scan test pads and the scan signal input pad, and lead out the second test portion.

6. The mother substrate according to claim 5, wherein each of the two scan test pads comprises a plurality of test terminals, different test terminals of the same scan test pad are connected to different scanning lines.

7. The mother substrate according to claim 6, wherein the scan signal input pad comprises a plurality of input terminals, each test terminal of the scan test pad is connected to different input terminals of the scan signal input pad.

8. The mother substrate according to claim 6, wherein the data test pad has a plurality of independent test terminals, and different test terminals thereof are connected to different data lines.

9. The mother substrate according to claim 1, wherein the switch array comprises a first metal layer and a second metal layer, one of the first test portion and the second test portion is located on the same layer as the first metal layer, and the other one of the first test portion and the second test portion is located on the same layer as the second metal layer.

10. The mother substrate according to claim 1, wherein the sub-substrate comprises a GOA circuit.

11. A display panel, comprising:
a mother substrate according to any one of claim 1;
a color film substrate disposed opposite to the mother substrate; and
a plastic frame disposed on the non-display area of the sub-substrate and located between the mother substrate and the color film substrate to support the color film substrate, and wherein the plastic frame passes through an orthographic overlapping area of the first test portion and the second test portion such that the first test portion and the second test portion are connected to each other in the orthographic overlapping area.

12. The display panel according to claim 11, wherein the signal line comprises a data line and a scanning line, the input pad comprises a data signal input pad and a scan signal input pad, the data line is connected to the data signal input pad, and one end of the scanning line lead out the first test portion, and another end of the scanning line is connected to the scan signal input pad and lead out the second test portion.

13. The display panel according to claim 11, wherein the mother substrate comprises a plurality of sub-substrates.

14. The display panel according to claim 11, wherein a data test pad is provided in the non-display area, the data line is connected to the data signal input pad and the data test pad.

15. The display panel according to claim 11, wherein two scan test pads are provided in each non-display area, the one end of the scanning line is connected to one of the two scan test pads and lead out the first test portion, another end of the scanning line is connected to the other one of the two scan test pads and the scan signal input pad, and lead out the second test portion.

16. The display panel according to claim 11, wherein each scan test pad comprises a plurality of test terminals, different test terminals of the same scan test pad are connected to different scanning lines.

17. The display panel according to claim 11, wherein the scan signal input pad comprises a plurality of input terminals, each test terminal of the scan test pad is connected to different input terminals of the scan signal input pad.

18. The display panel according to claim 11, wherein the switch array comprises a first metal layer and a second metal layer, one of the first test portion and the second test portion is located on the same layer as the first metal layer, and the other one of the first test portion and the second test portion is located on the same layer as the second metal layer.

19. The display panel according to claim 11, wherein the sub-substrate comprises a GOA circuit.

20. The display panel according to claim 11, wherein the data test pad has a plurality of independent test terminals, and different test terminals thereof are connected to different data lines.

* * * * *